United States Patent
Hidding et al.

(10) Patent No.: US 7,946,819 B2
(45) Date of Patent: May 24, 2011

(54) WIND TURBINE DRIVE SHAFT CONNECTION ARRANGEMENT

(75) Inventors: Edwin Hidding, Rhede (DE); Christian Becker, Salzbergen (DE); Yvo Blokhuis, Haaksbergen (NL); Scott Thomason, Greer, SC (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 12/323,985

(22) Filed: Nov. 26, 2008

(65) Prior Publication Data

US 2010/0129222 A1    May 27, 2010

(51) Int. Cl.
*F03D 11/02* (2006.01)
*F16D 1/02* (2006.01)
(52) U.S. Cl. ................ 416/170 R; 416/204 R
(58) Field of Classification Search ........... 415/124.1, 415/124.2; 416/170 R, 204 R
See application file for complete search history.

(56) References Cited

U.S. PATENT DOCUMENTS

| | | | | | |
|---|---|---|---|---|---|
| 3,063,743 A | * | 11/1962 | Kylen | ............... | 403/40 |
| 4,457,737 A | * | 7/1984 | Sharples | ............... | 464/99 |
| 6,616,412 B2 | * | 9/2003 | Haugen et al. | ............ | 416/244 R |
| 2006/0220389 A1 | * | 10/2006 | Shibata et al. | ............ | 290/55 |
| 2007/0290509 A1 | * | 12/2007 | Nitzpon | ............ | 290/55 |

FOREIGN PATENT DOCUMENTS

| | | | |
|---|---|---|---|
| EP | 1457673 A1 | * | 9/2004 |
| JP | 2004339953 A | * | 12/2004 |
| WO | WO 2009080712 A2 | * | 7/2009 |

* cited by examiner

*Primary Examiner* — Edward Look
*Assistant Examiner* — Jesse Prager
(74) *Attorney, Agent, or Firm* — Global Patent Operation; Douglas D. Zhang

(57) ABSTRACT

A connection arrangement for connecting drive shafts of a wind turbine including a rotor having a rotor shaft and a hub, and a gearbox having a gearbox input shaft is provided. The connection arrangement includes a first shaft connection means having a recessed portion arranged at the rotor shaft symmetrically to the axis of the rotor shaft, a second shaft connection means having a protruding portion arranged symmetrically to the axis of the gearbox input shaft, wherein the protruding portion of the second shaft connection means engages with the recessed portion of the first shaft connection means, and a fixing means for fixing the protruding portion of the first shaft connection means at the recessed portion of the second shaft connection means. A frictionally engaged connection is provided.

12 Claims, 7 Drawing Sheets

WIND TURBINE DRIVE SHAFT CONNECTION ARRANGEMENT

BACKGROUND

The present disclosure generally relates to wind turbines having a rotor including a rotor shaft and a plurality of rotor blades and a hub. In particular, the present disclosure relates to a connection arrangement for connecting drive shafts of the wind turbine with other components within a machine nacelle of the wind turbine, e.g. with a shaft of a gearbox.

Wind turbines are of increasing importance as an environmentally safe and relatively inexpensive source of alternative energy. As there is an increased demand for an improved wind turbine performance, many efforts have been made in order to provide a secure connection between the wind turbine rotor shaft and the shaft of a gearbox which follows in the mechanical drive train.

Therefore a good mechanical connection between the rotor shaft of the rotor of a wind turbine and the gearbox shaft is an issue. Typical problems that arise with respect to the connection arrangement are limited rigidity, maintenance intervals and accessibility, amongst others.

SUMMARY

In view of the above, a connection arrangement for connecting drive shafts of a wind turbine including a rotor having a rotor shaft and a hub, and a gearbox having a gearbox input shaft is provided, said connection arrangement including a first shaft connection means having a recessed portion arranged at the rotor shaft symmetrically to the axis of the rotor shaft, a second shaft connection means having a protruding portion arranged symmetrically to the axis of the gearbox input shaft, wherein the protruding portion of the second shaft connection means engages with the recessed portion of the first shaft connection means, and a fixing means for fixing the protruding portion of the first shaft connection means at the recessed portion of the second shaft connection means, wherein a frictionally engaged connection is provided.

According to another aspect a wind turbine including a rotor having a rotor shaft and a hub, a gearbox and a connection arrangement adapted for connecting the rotor shaft and a gearbox input shaft is provided, the connection arrangement including a first shaft connection means having a recessed portion arranged at the rotor shaft symmetrically to the axis of the rotor shaft, a second shaft connection means having a protruding portion arranged symmetrically to the axis of the gearbox input shaft, wherein the protruding portion of the second shaft connection means engages with the recessed portion of the first shaft connection means, and a fixing means for fixing the protruding portion of the first shaft connection means at the recessed portion of the second shaft connection means, wherein a frictionally engaged connection is provided.

According to yet another aspect a connection arrangement for connecting drive shafts of a wind turbine including a rotor having a rotor shaft and a hub, and a gearbox having a gearbox input shaft is provided, said connection arrangement including a rotor shaft flange attachable to the rotor shaft, a gearbox shaft flange attachable to the gearbox input shaft, and a bolt ring adapted for connecting the rotor shaft flange and the gearbox shaft flange.

Further exemplary embodiments are according to the dependent claims, the description and the accompanying drawings.

DRAWINGS

A full and enabling disclosure of the present invention, including the best mode thereof, to one of ordinary skill in the art is set forth more particularly in the remainder of the specification including reference to the accompanying drawings wherein.

DETAILED DESCRIPTION

Figure 1:
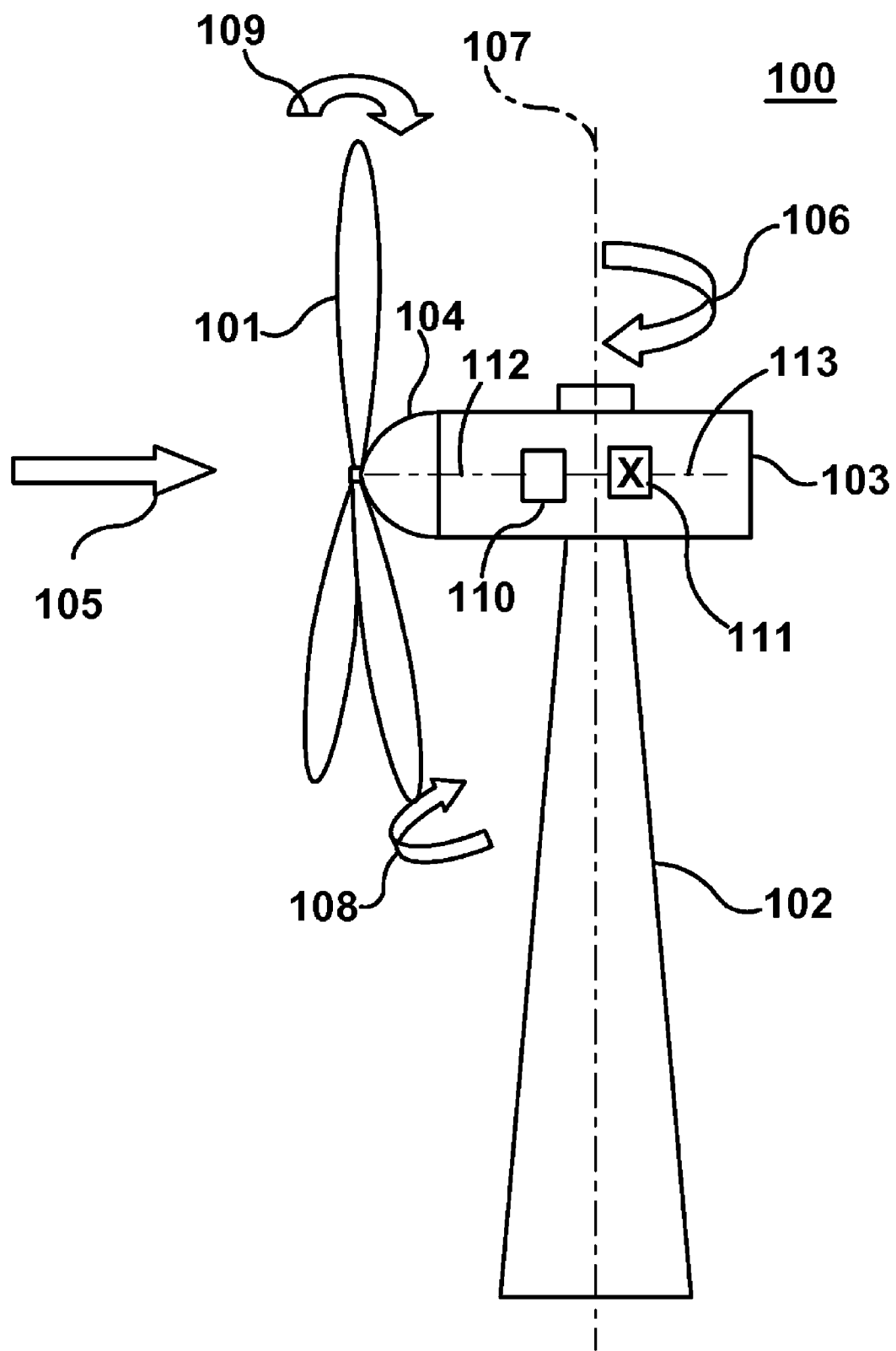
FIG. 1 shows a wind turbine including a tubular tower and a rotatable machine nacelle having a rotor with a plurality of rotor blades and a hub.

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

FIG. 1 illustrates a wind turbine 100 which includes a tubular tower 102 and a machine nacelle 103 which is rotatable about a vertical axis 107. A rotation about the vertical axis 107 is provided by a yaw moment 106 about the axis 107. Furthermore, the wind turbine includes a rotor having a plurality of rotor blades 101 and a hub 104.

The machine nacelle 103 which is rotatable about the vertical axis 107 is directed towards the incoming wind direction 105 by applying the yaw moment 106. When the rotor having the plurality of rotor blades 101 is rotating, the rotor shaft 112 of the wind turbine is driven. The rotor shaft 112 is connected to a gearbox 111 by means of a connection arrangement 110. A gearbox output shaft 113 is used to drive a means for generating electrical power, e.g. an electrical generator (not shown in FIG. 1). Due to the force of the incoming wind having the wind direction 105, a pitching moment 109 as shown in FIG. 1 might occur.

Furthermore, it is possible to change a pitch angle 108 of each individual rotor blade 101. A substantial part of the drive train of a wind turbine is the connection portion between the rotor shaft 112 of the wind turbine and downstream components. Typically, the connection between the rotor shaft 112 and downstream components is a critical issue with respect to weight, failure, maintenance interval, etc.

Figure 2:
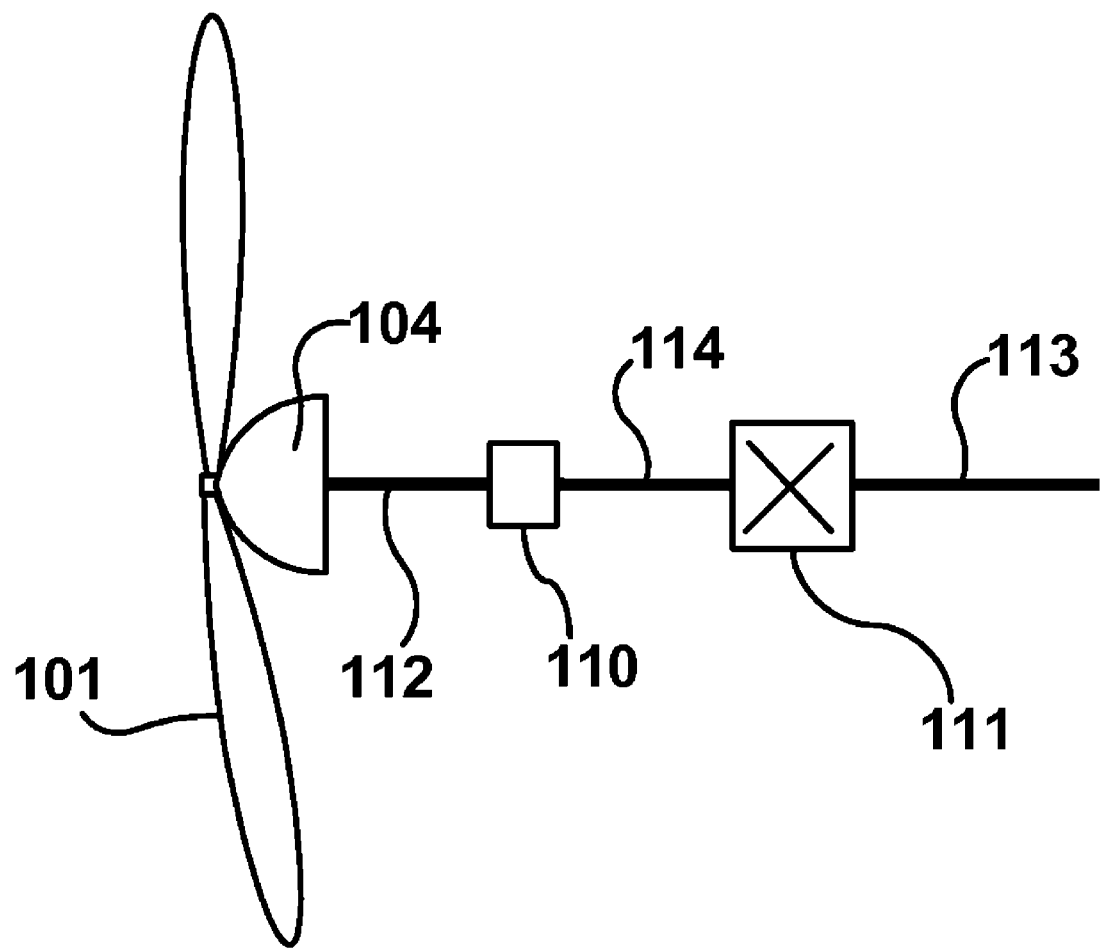
FIG. 2 illustrates components of the interior of the machine nacelle according to a typical embodiment.

FIG. 2 illustrates components of a drive train of a wind turbine according to a typical embodiment. As shown in FIG. 2, the rotor of a wind turbine having a hub 104 and rotor blades 101 is connected to the rotor shaft 112 of the wind turbine 100. The drive train of the wind turbine furthermore comprises a gearbox 111 having a gearbox input shaft 114 and a gearbox output shaft 113 in order to adapt the rotational frequency of the rotor shaft 112 to a rotational frequency which is required at the gearbox output shaft 113. A connection arrangement 110 is provided for connecting the rotor shaft 112 and the gearbox input shaft 114.

Figure 3:
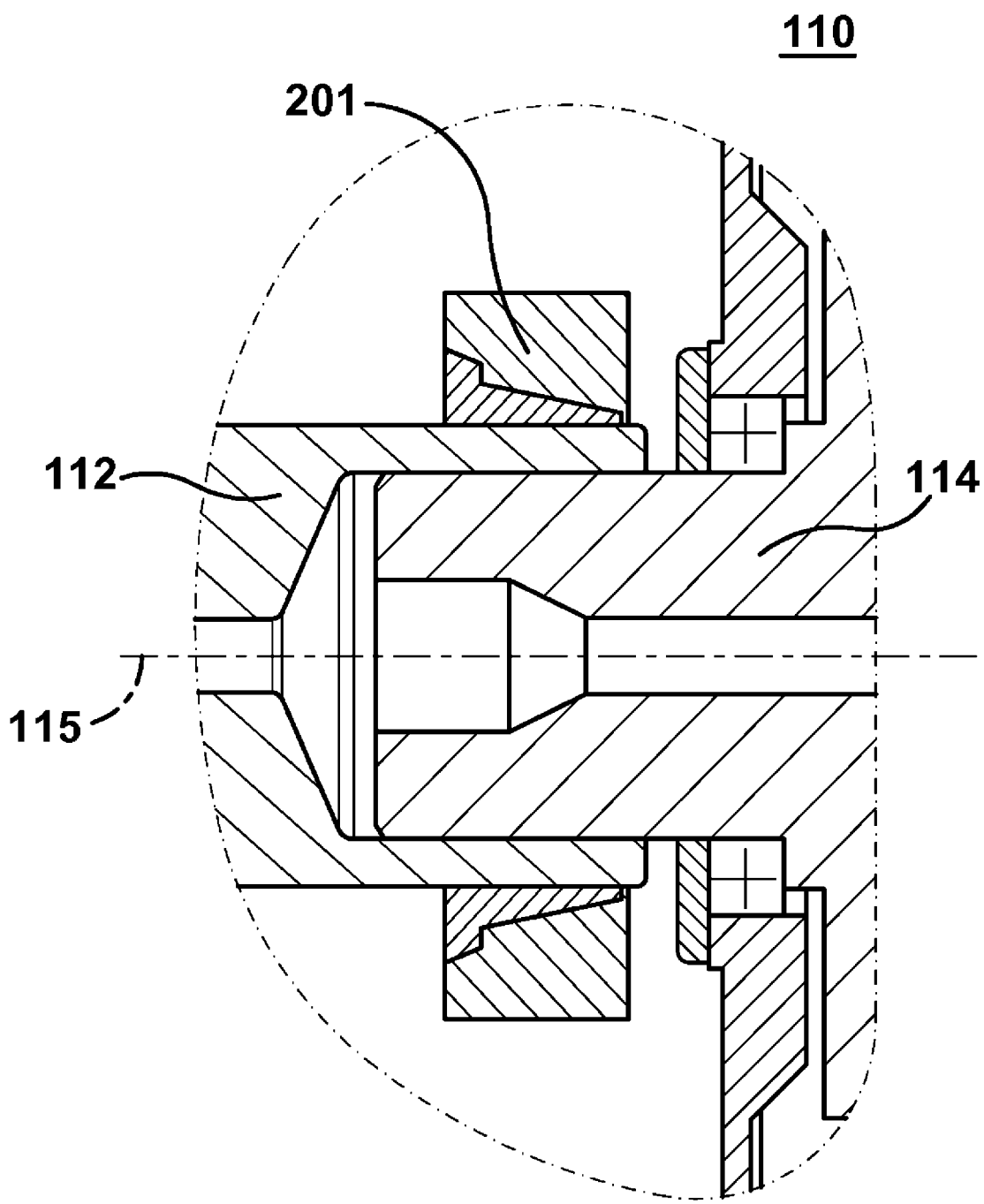
FIG. 3 shows a cross-section of a first embodiment of a connection arrangement.

FIG. 3 shows the connection arrangement 110 according to a typical embodiment in more detail. FIG. 3 is a cross-section of the connection arrangement 110 illustrating the connection of the rotor shaft 112 and the gearbox input shaft 114. In the typical embodiment shown in FIG. 3, the rotor shaft 112 has a recessed portion arranged symmetrically to a rotation axis 115 of the rotor shaft 112. The gearbox input shaft 114 has a protruding portion arranged symmetrically to the rotation axis 115 of the gearbox input shaft 114. The protruding portion of the gearbox input shaft 114 engages with the recessed portion of the rotor shaft 112.

It is noted here that albeit straight shafts are shown in the drawings, it is possible to provide shafts having at least one step portion at the location of a shaft connection.

Furthermore, a shrink disc 201 is provided which is adapted to fit around the periphery of the rotor shaft 112. The shrink disc 201 provides a frictionally engaged connection between the rotor shaft 112 and the gearbox input shaft 114.

Thus, a first shaft connection means having the recessed portion arranged symmetrically to the axis of the rotor shaft 112 and a second shaft connection means having a protruding portion arranged symmetrically to the axis of the gearbox input shaft 114 are fixed by a fixing means which in this typical embodiment is provided as a shrink disc 201. It is noted here that the axis of the rotor shaft 112 and the axis of the gearbox input shaft 114 both coincide with the rotation axis 115 shown in FIG. 3.

Typically, the first shaft connection means is an end portion of the rotor shaft 112 of the wind turbine 100 and the second shaft connection means is an end portion of the gearbox input shaft 114 (gearbox input shaft) of the wind turbine 100.

The connection arrangement 110 may be provided as a connection means between the gearbox output shaft 113 (gearbox driven shaft) of the wind turbine 100 and an output shaft of the wind turbine 100. Thus, the first shaft connection means may be an end portion of the gearbox driven shaft 113 of the wind turbine 100 and the second shaft connection means may be an end portion of the output shaft of the wind turbine. Furthermore, the second shaft connection means may be an end portion of the gearbox driven shaft (gearbox output shaft) 113 of the wind turbine 100 and the first shaft connection means may be an end portion of an output shaft of the wind turbine 100. It is noted here that the output shaft of the wind turbine 100 is not shown in FIGS. 2 and 3.

The rotor shaft 112 and the gearbox input shaft 114 are connected by using a frictional engagement, when the shrink disc 201 is shrunk onto the rotor shaft 112.

Figure 4:
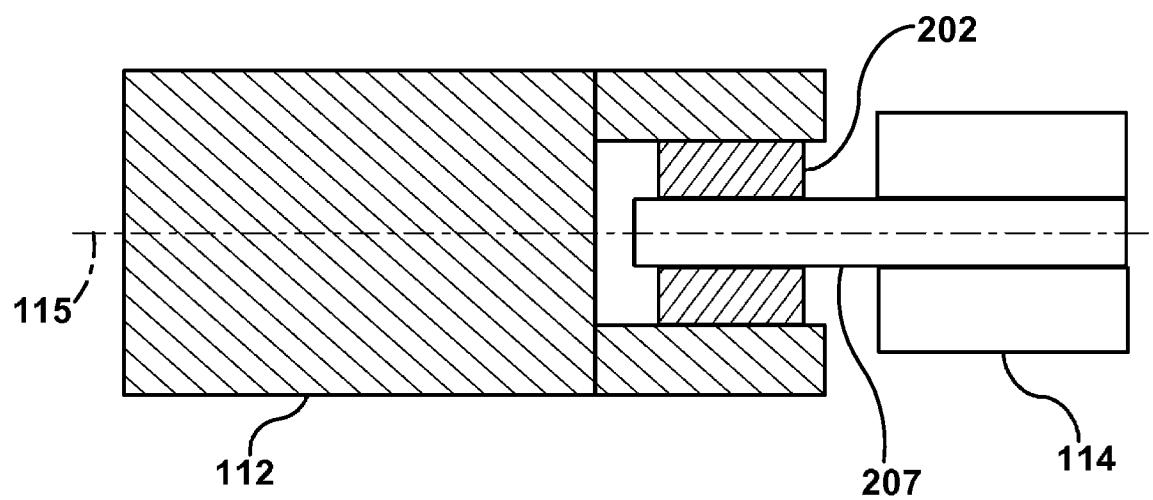
FIG. 4 illustrates another embodiment of a connection arrangement.

FIG. 4 is an illustration of another typical embodiment of the connection arrangement 110. As shown in FIG. 4, all components are arranged in a cylindrical symmetry about the rotation axis 115. FIG. 4 is a cross-section of the connection arrangement 110. As before, the rotor shaft 112 is shown to have a recessed portion arranged in cylindrical symmetry about the rotation axis 115.

The gearbox input shaft 114 has a protruding portion 207 wherein the protruding portion has a cylindrical symmetry and an outer diameter which is less than the inner diameter of the recessed portion of the rotor shaft 112. The space between the inner walls of the recessed portion of the rotor shaft 112 and the outer surface of the protruding portion 207 of the gearbox input shaft 114 is filled by an annular, cylindrical element 202 which is provided as an expansion element.

The rotor shaft 112 and the gearbox input shaft 114 are connected by a frictional engagement, if the annular element 202 is expanded such that the gearbox input shaft 114 and the rotor shaft 112 are symmetrically connected.

Thus, the second shaft connection means having the protruding portion arranged symmetrically to the rotation axis 115 of the gearbox input shaft 114 penetrates into the recessed portion of the rotor shaft 112 wherein a space is provided between the recessed portion and the protruding portion. The space is filled by an annular element 202 which is arranged symmetrically to the rotation axis 115 of the gearbox input shaft 114. The annular element fits into the space between the recessed portion and the protruding portion such that a frictionally engaged connection between the protruding portion, the annular element 202 and the recessed portion is provided.

Figure 5:
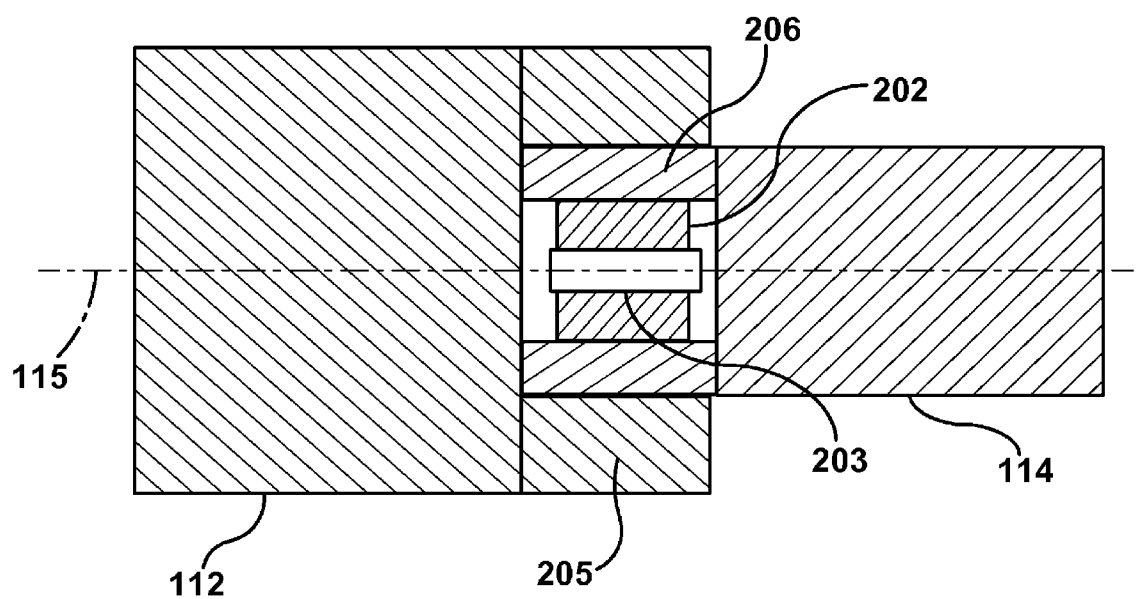
FIG. 5 illustrates yet another embodiment of the connection arrangement.

FIG. 5 shows a connection arrangement 100 according to another typical embodiment. As before (FIGS. 3, 4), the rotor shaft 112 has a recessed portion arranged symmetrically to the rotation axis 115. In contrast to the embodiments shown in FIGS. 3 and 4, the gearbox input shaft 114 has also a recessed portion. A first recessed portion 205 corresponds to the rotor shaft 112 wherein a second recessed portion 206 corresponds to the gearbox input shaft 114.

As shown in FIG. 5, the gearbox input shaft 114 together with its recessed portion 206 fits into the recessed portion 205 of the rotor shaft 112. It is noted here that the rotation axis 115 is a central axis of both the rotor shaft 112 and the gearbox input shaft 114. Thus, a first shaft connection means having the recessed portion 204 is arranged symmetrically to the rotation axis 115 of the rotor shaft 112, wherein a second shaft connection means having the second recessed portion 206 is arranged symmetrically to the rotation axis 115 of the gearbox input shaft 114.

The second recessed portion 206 of the second shaft connection means engages with the first recessed portion 205 of the first shaft connection means. Within the second recessed portion 206, a cylindrical element 203 is arranged symmetrically to the rotation axis 115 of the rotor shaft 112 and the gearbox input shaft 114, respectively. The cylindrical element 203 engages with the first recessed portion 205 of the first shaft connection means.

Furthermore, a frictionally engaged connection is provided by an annular element 202 which is arranged between the inner surface of the second recessed portion 206 of the gearbox input shaft 114 and the outer surface of the cylindrical element 203.

The annular element 202 may be provided as an expansion element such that an expansion of this element causes a frictionally engaged connection between the rotor shaft 112 and the gearbox input shaft 114. Thus, the annular element 202 which is an expansion element provides a fixing of the recessed portion at the protruding portion. Furthermore, it is possible to provide a fixing means as a shrink disc which is arranged coaxially around the first shaft connection means (not shown in FIG. 5).

It is noted here that recessed and protruding portions of the rotor shaft 112 and the gearbox input shaft 114 may be exchanged, respectively. Thus, it is possible to insert a protruding portion of the gearbox input shaft 114 into a recessed portion of the rotor shaft 112. Furthermore, it is possible to insert a protruding portion of the rotor shaft 112 into a recessed portion of the gearbox input shaft 114. In a typical embodiment, the rotor shaft 112 is made of high-strength steal and thus can bear high stress such that it is according to a typical embodiment, that the rotor shaft 112 includes the recessed portion wherein the gearbox input shaft 114 has the protruding portion.

Furthermore, bearings of the rotor shaft 112 and bearings of the gearbox input shaft 114 may have the same diameter.

Figure 6:
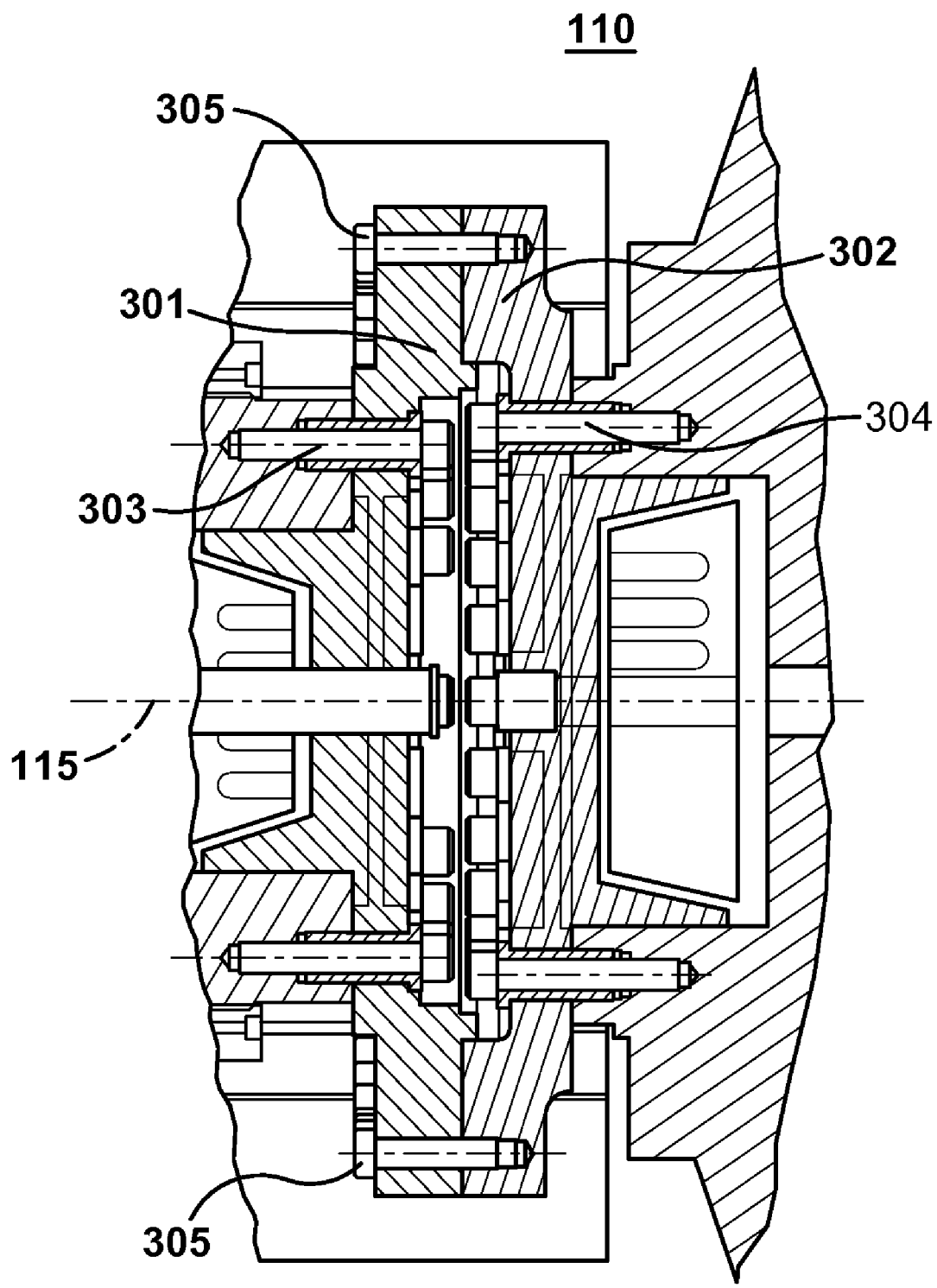
FIG. 6 is a cross-section of a connection arrangement according to yet another typical embodiment.

According to another typical embodiment a bolt ring is provided as a connection device. FIG. 6 is a cross-sectional view of the connection arrangement 110 wherein details shown in FIG. 6 include a rotor shaft flange 301, a gearbox shaft flange 302 and rotor shaft bolts 303 used for a connection of the respective drive shaft, e.g. the rotor shaft 112 to the connection means 110. On the other hand, the gearbox shaft bolts 304 are provided in order to connect the connection arrangement 110 to a gearbox input shaft 114 (not shown in FIG. 6). Furthermore, flange connectors 305 are provided in order to connect the rotor shaft flange 301 and the gearbox shaft flange 302 to each other.

Figure 7:
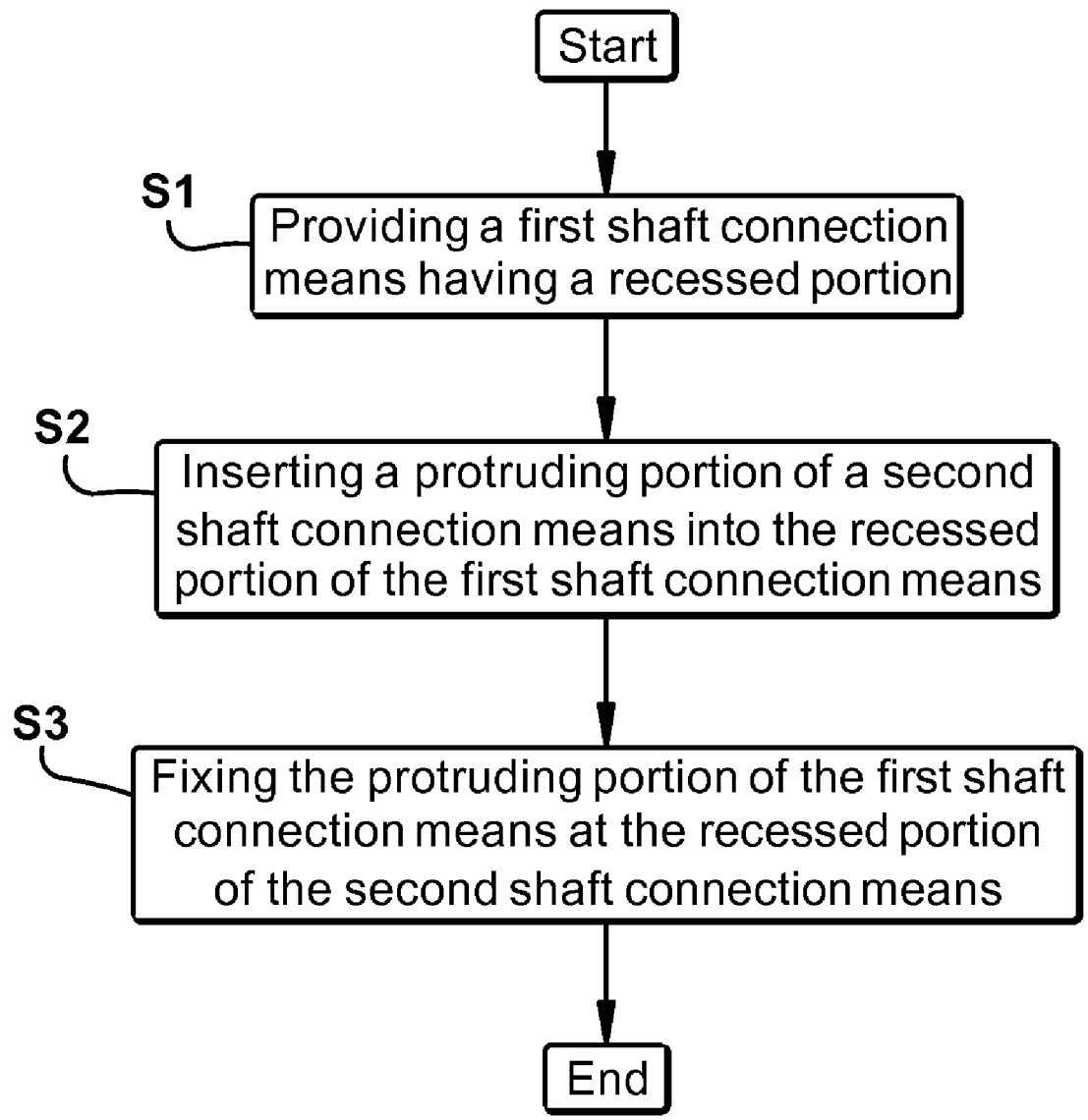
FIG. 7 is a flowchart illustrating a method for connecting drive shafts of a wind turbine according to a typical embodiment.

FIG. 7 is a flowchart of a method for connecting drive shafts of a wind turbine according to yet another typical embodiment. In a first step S1, a first shaft connection means having a recessed portion is provided. The recessed portion is arranged symmetrically to the rotation axis 115 (see FIG. 3-6) of the rotor shaft. Then the procedure continues at step S2 where a protruding portion of a second shaft connection means arranged symmetrically to the rotation axis 115 of the gearbox input shaft is inserted into the recessed portion of the first drive shaft connection means.

Then, at a step S3, the protruding portion of the first shaft connection means is fixed at the recessed portion of the second shaft connection means wherein a frictional engaged connection is provided. A cylindrical element may be arranged symmetrically to the rotation axis 115 of the rotor shaft, wherein the cylindrical element engages with the first recessed portion of the first shaft connection means.

Furthermore, a second shaft connection means may be provided which has a second recessed portion arranged symmetrically to the rotation axis 115 of the gearbox input shaft wherein the second recessed portion of the second shaft connection means engages with the first recessed portion of the first shaft connection means. In addition to that, the second recessed portion is pressed to watch the first recessed portion by means of an expansion of the cylindrical element. A bolt ring may be provided in addition to the fixing means.

According to a typical embodiment, a cylindrical element may be arranged symmetrically to the axis of the rotor shaft, wherein the cylindrical element engages with the first recessed portion of the first shaft connection means.

Furthermore, a second shaft connection means may be provided having a second recessed portion arranged symmetrically to the axis of the gearbox input shaft, wherein the second recessed portion of the second shaft connection means engages with the first recessed portion of the first shaft connection means. According to a typical embodiment the second recessed portion is pressed towards the first recessed portion by means of an expansion of the cylindrical element.

The invention has been described on the basis of embodiments which are shown in the appended drawings and from which further advantages and modifications emerge. However, the invention is not restricted to the embodiments described in concrete terms, but rather can be modified and varied in a suitable manner. It lies within the scope of the invention to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the invention disclosed and its broader aspects. That is, all examples set forth herein above are intended to be exemplary and non-limiting.

The invention claimed is:

1. A connection arrangement for connecting drive shafts of a wind turbine comprising a rotor having a rotor shaft, and a gearbox having a gearbox input shaft, said connection arrangement comprising:
   a first shaft connection comprising a first recessed portion arranged at the rotor shaft symmetrically to an axis of the rotor shaft;
   a second shaft connection comprising a second recessed portion arranged at the gearbox input shaft symmetrically to an axis of the gearbox input shaft, the second recessed portion engaging the first recessed portion; and
   a fixing arrangement comprising:
      a cylindrical element arranged in the second recessed portion and being symmetrical to the axis of the rotor shaft; and
      an annular element arranged between air inner surface of the second recessed portion and an outer surface of the cylindrical element and configured to form a frictionally engaged connection therebetween.

2. The connection arrangement of claim 1, wherein the first shaft connection is an end portion of the rotor shaft and the second shaft connection is an end portion of the gearbox input shaft.

3. The connection arrangement of claim 1, wherein at least one of the cylindrical element and the annular element is an expansion element which presses the second recessed portion towards the first recessed portion.

4. The connection arrangement of claim 1, wherein the second recessed portion penetrates into the first recessed portion.

5. A wind turbine comprising a rotor having a rotor shaft, a gearbox having a gearbox input shaft and a connection arrangement for connecting the rotor shaft and the gearbox input shaft, the connection arrangement comprising:
   a first shaft connection comprising a first recessed portion arranged at the rotor shaft symmetrically to an axis of the rotor shaft;
   a second shaft connection comprising a second recessed portion arranged at the gearbox input shaft symmetrically to an axis of the gearbox input shaft, the second recessed portion engaging the first recessed portion; and
   a fixing arrangement comprising:
      a cylindrical element arranged in the second recessed portion and being symmetrical to the axis of the rotor shaft; and
      an annular element arranged between an inner surface of the second recessed portion and an outer surface of the cylindrical element and configured to form a frictionally engaged connection therebetween.

6. The wind turbine of claim 5, wherein the first shaft connection is an end portion of the rotor shaft and the second shaft connection is an end portion of the gearbox input shaft.

7. The wind turbine of claim 5, wherein at least one of the cylindrical element and the annular element is an expansion element which presses the second recessed portion towards the first recessed portion.

8. The wind turbine of claim 5, wherein the second recessed portion penetrates into the first recessed portion.

9. A connection arrangement for connecting a first shaft to a second shaft, comprising:
- a first shaft connection comprising a first recessed portion arranged at the first shaft;
- a second shaft connection comprising a second recessed portion arranged at the second shaft, one of the first recessed portion and the second recessed portion receiving and engaging the other of the first recessed portion and the second recessed portion,
- the first shaft being a rotor shaft of a wind turbine and the second shaft being a gearbox input shaft of a gearbox of the wind turbine; and
- a fixing arrangement comprising:
  - a cylindrical element arranged in the other of the first recessed portion and the second recessed portion; and
  - an annular element arranged between an inner surface of the other of the first recessed portion and the second recessed portion and an outer surface of the cylindrical element and configured to form a frictionally engaged connection therebetween.

10. The connection arrangement of claim 9, wherein the first shaft connection is an end portion of the first shaft, and the second shaft connection is an end portion of the second shaft.

11. The connection arrangement of claim 10, wherein the second recessed portion is received in the first recessed portion.

12. The connection arrangement of claim 11, wherein at least one of the cylindrical element and the annular element is an expansion element which presses the second recessed portion towards the first recessed portion.

* * * * *

UNITED STATES PATENT AND TRADEMARK OFFICE
CERTIFICATE OF CORRECTION

| | | |
|---|---|---|
| PATENT NO. | : 7,946,819 B2 | Page 1 of 1 |
| APPLICATION NO. | : 12/323985 | |
| DATED | : May 24, 2011 | |
| INVENTOR(S) | : Edwin Hidding et al. | |

It is certified that error appears in the above-identified patent and that said Letters Patent is hereby corrected as shown below:

In Column 4, Line 22, delete "100" and insert -- 110 --, therefor.

In Column 6, Line 25, in Claim 1, delete "air" and insert -- an --, therefor.

Signed and Sealed this
Twenty-second Day of November, 2011

David J. Kappos
*Director of the United States Patent and Trademark Office*